US012612895B2

(12) United States Patent
Nayebi et al.

(10) Patent No.: US 12,612,895 B2
(45) Date of Patent: Apr. 28, 2026

(54) METHOD FOR CONTROLLING A RENEWABLE ENERGY FARM IN COMPLIANCE WITH OBLIGATIONS TOWARDS A POWER GRID

(71) Applicant: VESTAS WIND SYSTEMS A/S, Aarhus (DK)

(72) Inventors: Kouroush Nayebi, Ikast (DK); Torsten Lund, Fredericia (DK); Frank Ormel, Skanderborg (DK); Mogens Bjerning, Ringkøbing (DK)

(73) Assignee: VESTAS WIND SYSTEMS A/S, Aarhus (DK)

( * ) Notice: Subject to any disclaimer, the term of this patent is extended or adjusted under 35 U.S.C. 154(b) by 628 days.

(21) Appl. No.: 17/574,392

(22) Filed: Jan. 12, 2022

(65) Prior Publication Data

US 2022/0220938 A1       Jul. 14, 2022

(30) Foreign Application Priority Data

Jan. 13, 2021     (EP) ..................................... 21151385

(51) Int. Cl.
F03D 7/04 (2006.01)
F03D 7/02 (2006.01)
(Continued)

(52) U.S. Cl.
CPC ........... F03D 7/0284 (2013.01); F03D 7/048 (2013.01); F03D 9/007 (2013.01); G05B 19/042 (2013.01);
(Continued)

(58) Field of Classification Search
USPC ....................................................... 700/287
See application file for complete search history.

(56) References Cited

U.S. PATENT DOCUMENTS 8,823,193 B1     9/2014  Yazghi et al.
9,856,855 B2     1/2018  Kjr et al.
(Continued)

FOREIGN PATENT DOCUMENTS

CN          1894837 A      1/2007
CN        205811554 U     12/2016
(Continued)

OTHER PUBLICATIONS

European Patent Office, Extended European Search Report for Application 21151385.8, Jun. 21, 2018.
(Continued)

*Primary Examiner* — Emilio J Saavedra
(74) *Attorney, Agent, or Firm* — Patterson + Sheridan, LLP; Gero G. McClellan

(57) ABSTRACT

A method for controlling a renewable energy farm comprising a plurality of wind turbines and at least one central control unit is disclosed. The wind turbines of the renewable energy farm are connected to a power grid. The central control unit receives a request for change in operation of at least one of the wind turbines, where execution of the change in operation causes a change in power output of the wind turbine. The central control unit checks whether or not the change in power output is in conflict with at least one obligation of the renewable energy farm towards the power grid. In the case that the change in power output is in conflict with at least one obligation of the renewable energy farm towards the power grid, execution of the change in operation is deferred.

14 Claims, 4 Drawing Sheets

(51) Int. Cl.

| | |
|---|---|
| *F03D 9/00* | (2016.01) |
| *G05B 19/042* | (2006.01) |
| *G06Q 50/06* | (2012.01) |
| *H02J 3/38* | (2006.01) |
| *F03D 9/25* | (2016.01) |
| *H02J 3/17* | (2026.01) |
| *H02J 3/46* | (2006.01) |
| *H02J 101/28* | (2026.01) |

(52) U.S. Cl.
CPC .............. *G06Q 50/06* (2013.01); *H02J 3/381* (2013.01); *F03D 9/255* (2017.02); *F05B 2220/708* (2013.01); *F05B 2270/1033* (2013.01); *G05B 2219/2619* (2013.01); *H02J 3/17* (2026.01); *H02J 3/46* (2013.01); *H02J 2101/28* (2026.01)

(56) References Cited

U.S. PATENT DOCUMENTS

| | | | | |
|---|---|---|---|---|
| 2007/0047163 | A1* | 3/2007 | Lutze | F03D 9/255 |
| | | | | 361/78 |
| 2012/0010755 | A1 | 1/2012 | Stapelfeldt | |
| 2012/0161444 | A1 | 6/2012 | Tarnowski | |
| 2012/0200086 | A1 | 8/2012 | Kang et al. | |
| 2013/0076003 | A1* | 3/2013 | Lanci | A61G 5/1043 |
| | | | | 5/655.3 |
| 2013/0076037 | A1* | 3/2013 | Garcia | H02J 3/381 |
| | | | | 290/44 |
| 2013/0110569 | A1* | 5/2013 | Meyerhofer | G06Q 10/10 |
| | | | | 705/7.16 |
| 2014/0207296 | A1* | 7/2014 | Kjær | F03D 7/048 |
| | | | | 700/287 |
| 2014/0379159 | A1* | 12/2014 | Kitagishi | G06Q 50/06 |
| | | | | 700/295 |
| 2015/0012146 | A1 | 1/2015 | Cherian et al. | |
| 2017/0234299 | A1* | 8/2017 | Kjær | F03D 9/257 |
| | | | | 290/44 |
| 2017/0321655 | A1* | 11/2017 | Møller | F03D 9/257 |
| 2018/0335017 | A1* | 11/2018 | Nielsen | F03D 7/026 |
| 2020/0271098 | A1* | 8/2020 | Hart | H02J 3/38 |

FOREIGN PATENT DOCUMENTS

| | | |
|---|---|---|
| CN | 111622897 A | 9/2020 |
| DE | 102016007098 A1 | 12/2017 |
| EP | 3068007 A1 | 9/2016 |

OTHER PUBLICATIONS

Office Action and Search Report received for Chinese Patent Application No. 202210030507.6, mailed on Feb. 24, 2025, 13 pages (6 pages of English Translation and 7 pages of Original Document).

Intention to grant Received for EP Application No. 21151385.8, mailed on Jul. 29, 2025, 8 pages.

Intention to grant Received for EP Application No. 21151385.8, mailed on Jan. 2, 2026, 6 pages.

* cited by examiner

METHOD FOR CONTROLLING A RENEWABLE ENERGY FARM IN COMPLIANCE WITH OBLIGATIONS TOWARDS A POWER GRID

FIELD OF THE INVENTION

The present invention relates to a method for controlling a renewable energy farm comprising a plurality of wind turbines and a central control unit. The wind turbines of the renewable energy farm are connected to a power grid. In the method according to the invention the renewable energy farm is controlled in such a manner that it is ensured that obligations towards the power grid are complied with.

BACKGROUND OF THE INVENTION

Wind turbines are often clustered together in entities which are referred to as 'renewable energy farms'. Renewable energy farms may, e.g., be wind farms where only wind turbines form the renewable energy generators of the renewable energy farm. As an alternative, renewable energy farms may be hybrid farms comprising renewable energy generators, e.g. wind turbines as well as photovoltaic cells. The renewable energy generators, e.g. wind turbines, of a renewable energy farm, or a subset of the renewable energy generators, may be connected to a power grid via a point of common coupling. Thereby the combined power output from the renewable energy generators is regarded as one power producer by the power grid. The renewable energy generators of a renewable energy farm are therefore normally controlled in a coordinated manner, in order to appropriately control the total power output from the renewable energy farm to the power grid.

However, the wind turbines of a renewable energy farm may also be subject to local control demands which are independent of the coordinated control at farm level. There is a risk that such local control demands may be in conflict with the farm level control demands, and/or with local control demands of one or more of the other wind turbines of the renewable energy farm.

U.S. Pat. No. 9,091,245 B2 discloses a system and a method for setting up, commissioning, and operating a wind power plant having a plurality of wind turbine generators operatively connected to a power grid. The system includes a reconfigurable power plant controller comprising a first regulator, a second regulator and a management system. The management system comprises a control mode compatibility unit that determines the compatibility of any new control mode to be selected in one of the regulators with the currently selected control modes, and a control mode prioritization unit that establishes the sequence in which the selected control modes are implemented in the regulators.

DESCRIPTION OF THE INVENTION

It is an object of embodiments of the invention to provide a method for controlling a renewable energy farm, in which conflicts between obligations of the renewable energy farm towards the power grid and individual control commands for the wind turbines of the renewable energy farm are avoided.

The invention provides a method for controlling a renewable energy farm comprising a plurality of wind turbines and at least one central control unit, the wind turbines of the renewable energy farm being connected to a power grid, the method comprising the steps of:

the central control unit receiving a request for change in operation of at least one of the wind turbines, where execution of the change in operation causes a change in power output of the wind turbine, the central control unit checking whether or not the change in power output is in conflict with at least one obligation of the renewable energy farm towards the power grid, and in the case that the change in power output is in conflict with at least one obligation of the renewable energy farm towards the power grid, deferring execution of the change in operation.

Thus, the method according to the invention is a method for controlling a renewable energy farm. In the present context the term 'renewable energy farm' should be interpreted to mean a plurality of renewable energy generators, such as wind turbines, arranged within a specified geographical area, and which share some infrastructure, such as internal power grid, connection to an external power grid, substations, access roads, etc. The renewable energy farm may be a wind farm or a hybrid farm, as described above. The renewable energy farm comprises a plurality of wind turbines being connected to a power grid. Furthermore, the renewable energy farm comprises a central control unit. In the present context the term 'central control unit' should be interpreted to mean a control unit which is communicatively connected to at least a subset of the plurality of wind turbines of the renewable energy farm, preferably to all of the wind turbines. Thus, the central control unit is able to communicate with the wind turbines, e.g. in order to transmit and/or receive control commands to/from the wind turbines, collect sensor data or other measurements from the wind turbines, etc. The central control unit may, e.g., be a power plant controller (PPC) being responsible for the overall control of the renewable energy farm. As an alternative, the central control unit may be a unit which is separate from the PPC, e.g. a dedicated unit.

In the method according to the invention, the central control unit initially receives a request for change in operation of at least one of the wind turbines. The request may be forwarded to the central control unit from (one of) the wind turbine(s) being affected by the requested change in operation, or the request may originate from another source, e.g. another central unit or being manually entered by an operator. The requested change in operation is of a kind which, when executed, will cause a change in power output of the wind turbine.

Next, the central control unit checks whether or not the change in power output is in conflict with at least one obligation of the renewable energy farm towards the power grid. Accordingly, the central control unit is in the possession of knowledge regarding obligations towards the power grid which the renewable energy farm is currently subjected to. For instance, the renewable energy farm may be obliged to supply a minimum power output to the power grid, to provide certain ancillary services, and/or any other suitable kind of obligation towards the power grid. This will be described in further detail below.

In the case that the change in power output is in conflict with at least one obligation of the renewable energy farm towards the power grid, then the execution of the change in operation is deferred.

Thus, the central control unit evaluates all requests for change of operation of the wind turbines of the renewable energy farm, regardless of whether the changes in operation are at renewable energy farm level, such as requests from the power grid, or the changes in operation are local, i.e. related to a single wind turbine or a small subset of wind turbines. Accordingly, the central control unit is able to ensure that a request for change in operation of a wind turbine is not in conflict with obligations towards the power grid, which the renewable energy farm is currently subjected to. Such obligations may not be 'known' to the individual wind turbine, and therefore a need for change of operation of a wind turbine, which is caused by local conditions, may not take such farm level obligations into account. Therefore, by providing all requests for change of operation of the wind turbines to the central control unit, the central control unit can take the farm level obligations into account, and thereby ensure that no request for change in operation of the wind turbines is executed if the result of execution of the request is that an obligation towards the power grid can not be fulfilled. Instead, the execution of the requested change in operation of the wind turbine is deferred, e.g. until it is possible to execute requested change in operation without conflicts with obligations towards the power grid. For instance, the execution of the requested change in operation of the wind turbine may be deferred until the relevant obligations towards the power grid are no longer valid, or until the operation of other renewable energy generators, e.g. other wind turbines, can fulfil the obligations.

It should be noted that deferred requests for change in operation of a wind turbine are not rejected. The execution of such requests is merely delayed until there is no longer a conflict with at least one obligation of the renewable energy farm towards the power grid. However, if the deferred request is no longer relevant at that time, the request will, of course, not be executed.

The step of checking whether or not the change in power output is in conflict with at least one obligation of the renewable energy farm towards to power grid may be repeated, in order to allow the requested change in operation to be executed as soon as it is no longer in conflict with obligations towards the power grid, if the requested change in operation is still relevant at that time.

The request for change in operation could, e.g., be a request for stopping the wind turbine. This could, e.g., be relevant in the case that a scheduled service is to be performed. Alternatively or additionally, a request for stopping the wind turbine could be triggered at a specific time of the day, e.g. in order to protect wild life, such as bats, birds or insects, in order to reduce noise during specific periods of the day, in order to reduce shadows or flicker, etc.

As an alternative, the request for change in operation could relate to local conditions at the wind turbine, e.g. in order to operate the wind turbine in an optimal manner and/or in order to minimise loads and/or wear on the wind turbine. For instance, the request for change in operation may be a request for changing an operating setpoint for the wind turbine, e.g. an active power setpoint and/or a reactive power setpoint. Alternatively or additionally, the request may include a limitation request, such as a rundown request from a system protection scheme.

The method may further comprise the step of:

in the case that the change in power output is not in conflict with at least one obligation of the renewable energy farm towards the power grid, allowing the change in operation.

According to this embodiment, in the case that the check performed by the central control unit reveals that there is no conflict between the requested change in operation and the currently applying obligations of the renewable energy farm towards the power grid, then the change in operation is simply executed as requested, without delay.

The execution of the change in operation may cause a decrease in power output of the wind turbine. This would, e.g., be in conflict with an obligation towards the power grid, which requires a high power output from the renewable energy farm to the power grid, for instance during a grid event. In this case the execution of the requested change in operation may be deferred until the grid event, or another cause which requires a high power output, has passed, and/or until the power production of one or more of the other renewable energy generators, e.g. other wind turbines, of the renewable energy farm has been increased in order to compensate for the power decrease caused by the requested change in operation.

Examples of changes in operation which cause a decrease in power output of a wind turbine include, but are not limited to, stopping the wind turbine, limiting the wind turbine, curtailing the wind turbine, etc.

As an alternative, the execution of the change in operation may cause an increase in power output of the wind turbine.

The step of checking whether or not the change in power output is in conflict with at least one obligation of the renewable energy farm towards the power grid may comprise the steps of:

comparing a frequency and/or a voltage of the power grid to a predefined deadband, and determining that the change in power output is in conflict with at least one obligation of the renewable energy farm towards the power grid in the case that the frequency and/or the voltage is outside the predefined deadband.

According to this embodiment, the frequency and/or the voltage of the power grid is/are monitored. It is important that the frequency as well as the voltage of a power grid is maintained within a specified range in order to ensure stability of the power grid. The specified ranges may be regarded as deadbands. If the frequency and/or the voltage of the power grid exceed the limits of the respective specified deadbands, measures need to be taken in order to prevent instability of the power grid. When the grid frequency and/or the grid voltage is/are outside the specified deadbands, this is sometimes referred to as a grid event, or as a frequency event or a voltage event, respectively.

During grid events, as defined above, renewable energy farms may be under the obligation to support the power grid by changing the supply of active and/or reactive power from the renewable energy farm to the power grid. For instance, in the case of an under-voltage event, i.e. if the voltage of the power grid is below the lower limit of the voltage deadband, the renewable energy farm may be obliged to increase reactive power supplied by the renewable energy farm to the power grid, in order to support the power grid.

Similarly, in the case of an over-voltage event, i.e. if the voltage of the power grid is above the upper limit of the voltage deadband, the renewable energy farm may be obliged to decrease reactive power supplied by the renewable energy farm to the power grid, in order to support the power grid.

Alternatively or additionally, in the case of an under-frequency event, i.e. if the frequency of the power grid is below the lower limit of the frequency deadband, the renewable energy farm may be obliged to increase active power supplied by the renewable energy farm to the power grid, in order to support the power grid.

Similarly, in the case of an over-frequency event, i.e. if the frequency of the power grid is above the upper limit of the frequency deadband, the renewable energy farm may be obliged to decrease active power supplied by the renewable energy farm to the power grid, in order to support the power grid.

Thus, by comparing a frequency and/or voltage of the power grid to a predefined deadband, it can be determined whether or not a grid event, in the form of a frequency event and/or a voltage event, is occurring in the power grid. If the frequency and/or voltage is within the deadband, then there is no grid event, and if the frequency and/or voltage is outside the deadband, then a grid event is occurring. In the case that a grid event is occurring, it can also be determined whether or not the grid event is of a kind which the renewable energy farm is obliged to react to, in the form of the grid support described above. If this is the case, and if the requested change in operation of at least one wind turbine causes a change in power output of the wind turbine which counteracts the grid supporting measures which the renewable energy farm is obliged to provide, then it can be concluded that the requested change in operation is in conflict with the grid supporting obligations of the renewable energy farm, and therefore execution of the requested change in operation is deferred, e.g. until the grid event is no longer occurring.

For instance, in the case that an under-frequency event is occurring, which requires an increased active power from the renewable energy farm to the power grid, and the requested change in operation causes a decrease in the active power output of the wind turbine, then the execution of the requested change in operation should be deferred, e.g. until the frequency of the power grid has been restored.

Alternatively or additionally, the step of checking whether or not the change in power output is in conflict with at least one obligation of the renewable energy farm towards the power grid may comprise the steps of:

checking whether or not a power output requirement from the renewable energy farm to the power grid is applicable, and determining that the change in power output is in conflict with at least one obligation of the renewable energy farm towards the power grid in the case that a power output requirement is applicable.

Renewable energy farms may be required to provide a specified power level to the power grid, e.g. complying with a specified power reference, e.g. in the form of a specified P/Q reference, where P represents active power and Q represents reactive power. Accordingly, if execution of the requested change in operation introduces a risk of a deviation from the specified power reference, then the execution of the requested change in operation should be deferred.

Alternatively or additionally, the operator of the renewable energy farm may have provided a power forecast, in the form of an expected power production of the renewable energy farm within a specified time interval. If such power forecasts are not met, the owner of the renewable energy farm may be penalised, often very heavily. Therefore, if execution of the requested change in operation introduces a risk that a power forecast is not fulfilled, then the execution of the requested change in operation should be deferred.

At least one of the at least one obligation towards the power grid may be an ancillary service obligation towards the power grid, and the step of checking whether or not the change in power output is in conflict with at least one obligation of the renewable energy farm towards the power grid may comprise the steps of:

estimating whether or not the change in power output is likely to cause incapability of fulfilling the ancillary service obligation, and determining that the change in power output is in conflict with at least one obligation of the renewable energy farm towards the power grid in the case that the change in power output is likely to cause incapability of fulfilling the ancillary service obligation.

Renewable energy farms may be committed to provide ancillary services to the power grid. In return, the renewable energy farm owner receives a fee from the grid operator for making the ancillary services available. Furthermore, if the renewable energy farm is unable to provide the requested service if the need occurs, then a penalty may be imposed on the owner of the renewable energy farm. Examples of such ancillary services include, but are not limited to, a spinning reserve, an obligation to provide grid support in the case of a grid event, etc.

Thus, if it turns out that the requested change in operation will cause a change in power output which introduces a risk that the renewable energy farm will be unable to fulfil the ancillary service obligation, then execution of the requested change in operation should be deferred. For instance, a requested change in operation of at least one wind turbine may cause a decrease in power output which reduces the spinning reserve of the renewable energy farm to a level where an obligation to make spinning reserve available can not be met.

The step of checking whether or not the change in power output is in conflict with at least one obligation of the renewable energy farm towards the power grid may be performed on the basis of a set of prioritizing rules.

According to this embodiment, the request for change in operation of the wind turbines, which are handled by the central control unit, are prioritized relative to each other. For instance, some requests for change of operation of the wind turbines may be occasioned by conditions which need to be acted upon, and executions of such requests should not be deferred for too long. On the other hand, other requests for change of operation of the wind turbines may be less critical in this regard. Therefore, if obligations of the renewable energy farm towards the power grid allow only some of the pending requests for change of operation of the wind turbines to be executed, then the most critical requests should be allowed to be executed, and the less critical requests can be deferred.

The renewable energy farm may further comprises a plurality of photovoltaic cells, and the method may further comprise the steps of:

the central control unit receiving a request for change in operation of at least one of the photovoltaic cells, where execution of the change in operation causes a change in power output of the photovoltaic cell, the central control unit checking whether or not the change in power output is in conflict with at least one obligation of the renewable energy farm towards the power grid, and in the case that the change in power output is in conflict with at least one obligation of the renewable energy farm towards the power grid, deferring execution of the change in operation.

According to this embodiment, the renewable energy farm is a hybrid farm, i.e. the renewable energy farm comprises renewable energy generators of various kinds. More particularly, in addition to a plurality of wind turbines, the renewable energy farm also comprises a plurality of photovoltaic cells. Moreover, the photovoltaic cells are also controlled in accordance with the method of the invention, i.e. essentially in the same manner as the wind turbines, and as described above. The remarks set forth above are therefore equally applicable here.

As an alternative, the renewable energy farm may be a wind farm, i.e. the renewable energy generators may be in the form of wind turbines only.

As described above, the central control unit may be a power plant controller (PPC). In this case the method is performed by a control unit which is already required in the renewable energy farm for other purposes than to perform the method of the invention. Accordingly, the method can be implemented without requiring additional hardware.

As an alternative, the central control unit may be a unit which is separate from the PPC.

BRIEF DESCRIPTION OF THE DRAWINGS

The invention will now be described in further detail with reference to the accompanying drawings in which.

DETAILED DESCRIPTION OF THE DRAWINGS

Figure 1:
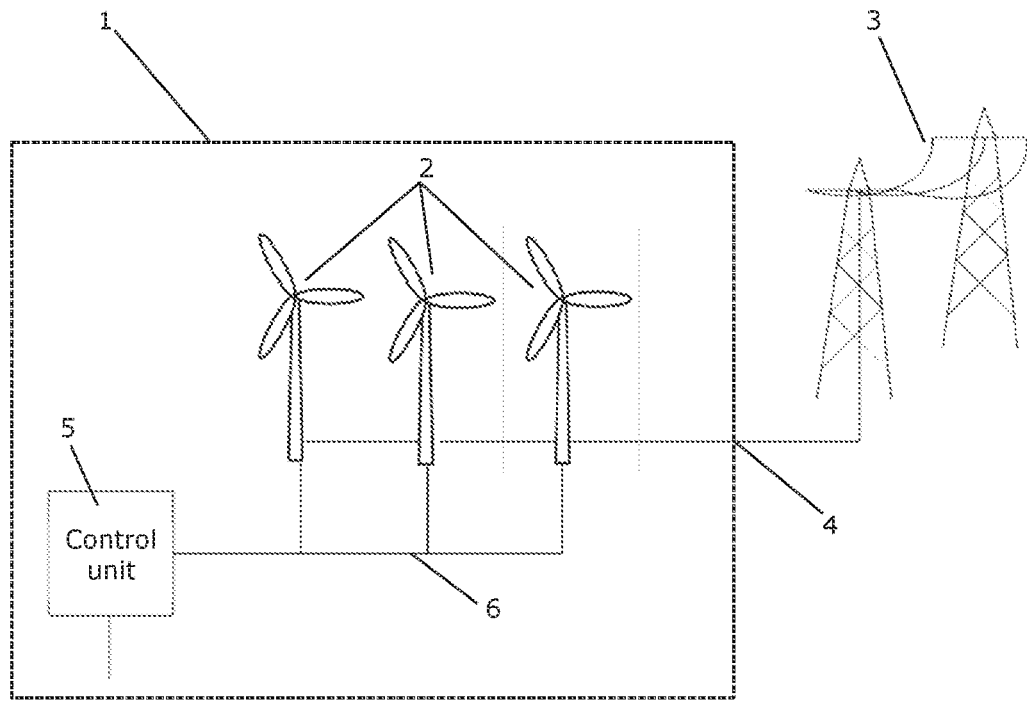
FIG. 1 is a diagrammatic view of a renewable energy farm, in the form of a wind farm, being controlled in accordance with a method according to an embodiment of the invention.

FIG. 1 is a diagrammatic view of a renewable energy farm 1, in the form of a wind farm, being controlled in accordance with a method according to an embodiment of the invention. The wind farm 1 comprises a plurality of wind turbines 2, three of which are shown. The wind turbines 2 are connected to a power grid 3 via a point of common coupling 4.

The wind farm 1 further comprises a central control unit 5 being connected to each of the wind turbines 2 via a communication connection 6. The central control unit 5 may, e.g., be a power plant controller (PPC) being responsible for the overall control of the wind farm 1. Alternatively, the central control unit 5 may be separate from the PPC. For instance, the central control unit 5 may be a unit which is dedicated to performing the method according to the invention.

The wind farm 1 of FIG. 1 may be controlled in the following manner. The central control unit 5 receives a request for change in operation at least one of the wind turbines 2.

The requested change in operation is of a kind which will cause a change in the power output of the wind turbine 2.

The central control unit 5 then checks whether or not the expected change in power output is in conflict with at least one obligation of the wind farm 1 towards the power grid 3. Such an obligation could, e.g., be an obligation to support the power grid 3 during an ongoing grid event, or an obligation to make a spinning reserve available to the power grid 3.

If it turns out that the change in power output is in conflict with at least one obligation of the wind farm 1 towards the power grid 3, then execution of the requested change in operation of the wind turbine 2 is deferred, e.g. until the obligation is no longer relevant or until other wind turbines 2 of the wind farm 1 are able to compensate for the changed power output. Thereby it is ensured that the obligations of the wind farm 1 towards the power grid 3 can be fulfilled.

If the expected change in power output is not in conflict with any obligations of the wind farm 1 towards the power grid 2, then the request is allowed, and the change in operation is executed as requested.

It should be noted that even though FIG. 1 illustrates a wind farm 1, it is within the scope of the present invention that the renewable energy farm is a hybrid farm, e.g. comprising photovoltaic cells in addition to the wind turbines 2 illustrated in FIG. 1. In this case the photovoltaic cells may also be controlled in the manner described above.

Figure 2:
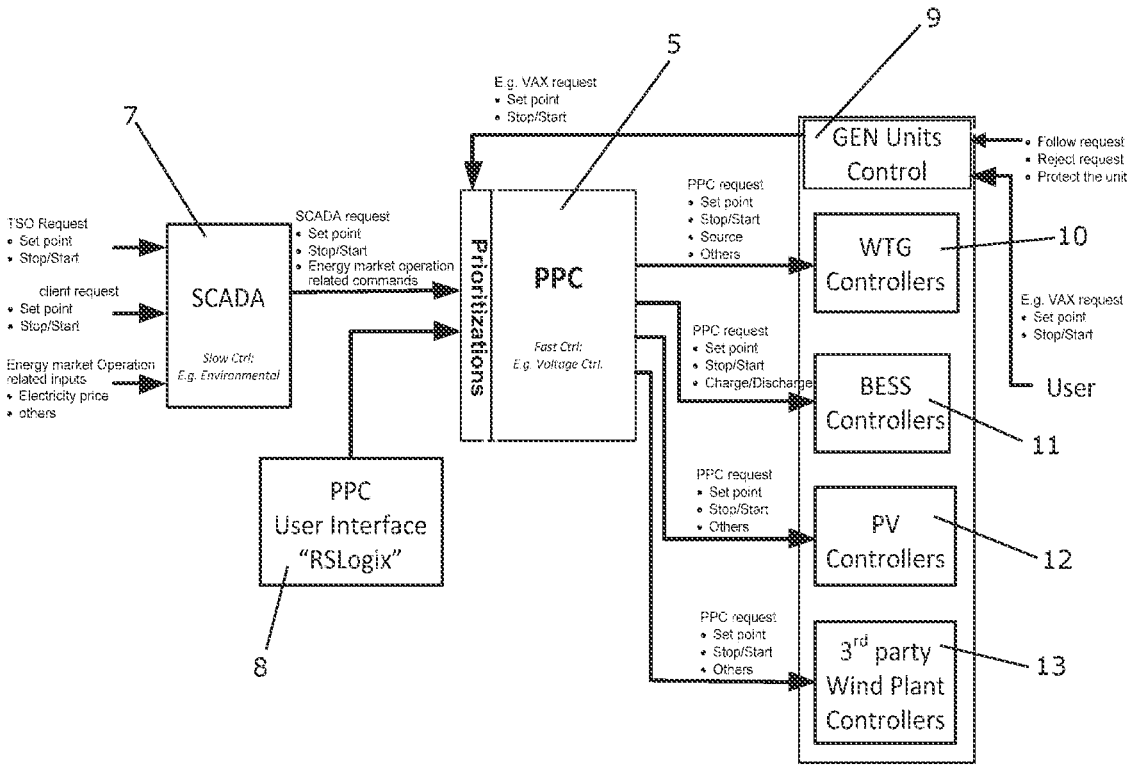
FIG. 2 is a block diagram illustrating a renewable energy farm being controlled in accordance with a method according to an embodiment of the invention.

FIG. 2 is a block diagram illustrating a renewable energy farm being controlled in accordance with a method according to an embodiment of the invention.

A central control unit 5, in the form of a power plant controller (PPC) is in communicative connection with a number of various units. For instance, the central control unit 5 receives input from a Supervisory Control and Data Acquisition (SCADA) system 7, a PPC user interface 8, and a general control unit 9. The SCADA system 7 may provide operating requests based on sensor data, requirements of the power grid, market information, etc. The PPC user interface 8 may be used for providing user settings, such as rules for prioritization of requests. The general control unit 9 is responsible for or oversees the operation of various entities of the renewable energy farm, and provides input regarding these entities, e.g. based on sensor measurements, power output, etc., to the central control unit 5.

The general control unit 9 is responsible for or oversees operation of wind turbine controllers 10, battery storage controllers 11, photovoltaic controllers 12, and third party wind plant controllers 13.

All requests for change of operation of the wind turbines of the renewable energy farm are supplied to the central control unit 5. Furthermore, the central control unit 5 is in the possession of knowledge regarding obligations of the renewable energy farm towards the power grid, and regarding the present state of the power grid.

Thus, when the central control unit 5 receives a request for change in operation of at least one of the wind turbines, it checks whether or not the requested change in operation is in conflict with one or more obligations of the renewable energy farm towards the power grid. More particularly, the central control unit checks whether or not a change in power output of the wind turbine, caused by the change in operation, is in conflict with one or more obligations of the renewable energy farm towards the power grid.

If the request for change in operation is in conflict with at least one obligation of the renewable energy farm towards the power grid, then execution of the change in operation is deferred, in order to ensure that the obligations towards the power grid are fulfilled. If there is no conflict, the request is allowed.

The central control unit 5 communicates the result of the investigation to the respective entities 10, 11, 12, 13, and the entities are operated in accordance therewith.

Thus, the method efficiently ensures that obligations of the renewable energy farm towards the power grid are fulfilled. This is possible because the central control unit 5 evaluates all requests for change in operation of the wind turbines, and therefore is able to defer requests which are in conflict with such obligations.

Figure 3:
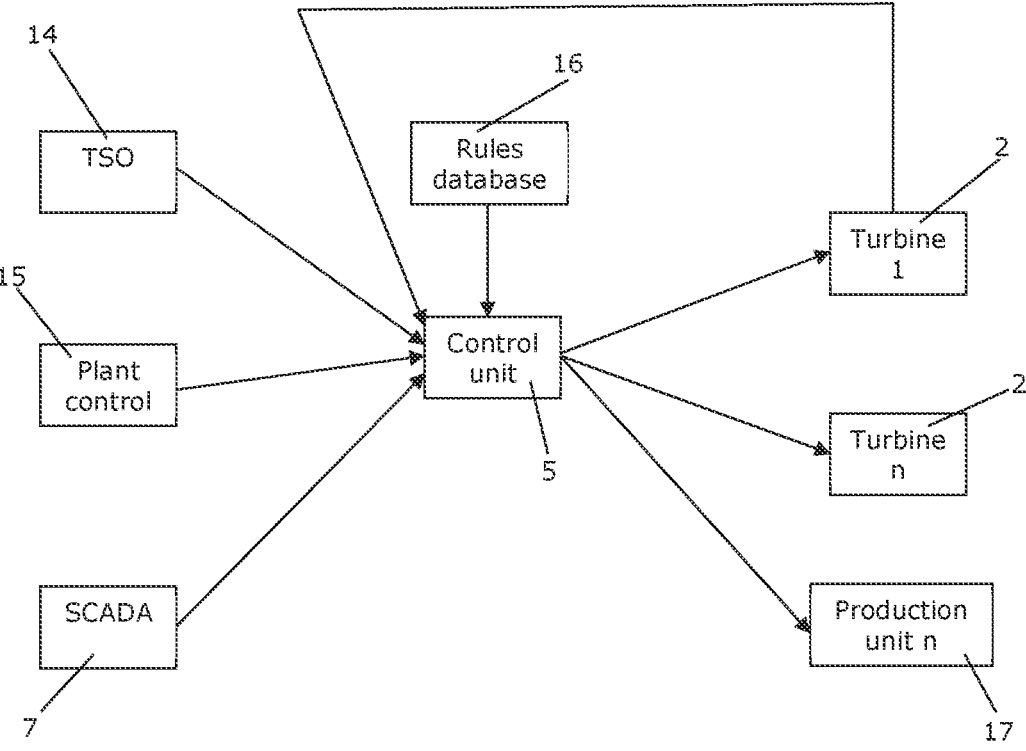
FIG. 3 is a block diagram illustrating a method according to an embodiment of the invention.

FIG. 3 is a block diagram illustrating a method according to an embodiment of the invention. A central control unit 5 receives input from a transmission system operator (TSO) 14, a plant controller 15 and a SCADA system 7. The central control unit 5 further receives data and requests from wind turbines 2. Based on input from a rules database 16, the central control unit 5 checks whether or not a received request for change in operation of a wind turbine 2 is in conflict with obligations of the renewable energy farm towards the power grid, and defers execution of the change in operation if this is the case, essentially as described above. Based on the evaluation, the central control unit 5 dispatches control signals to the wind turbines 2 and possibly to other production units 17 of the renewable energy farm.

Figure 4:
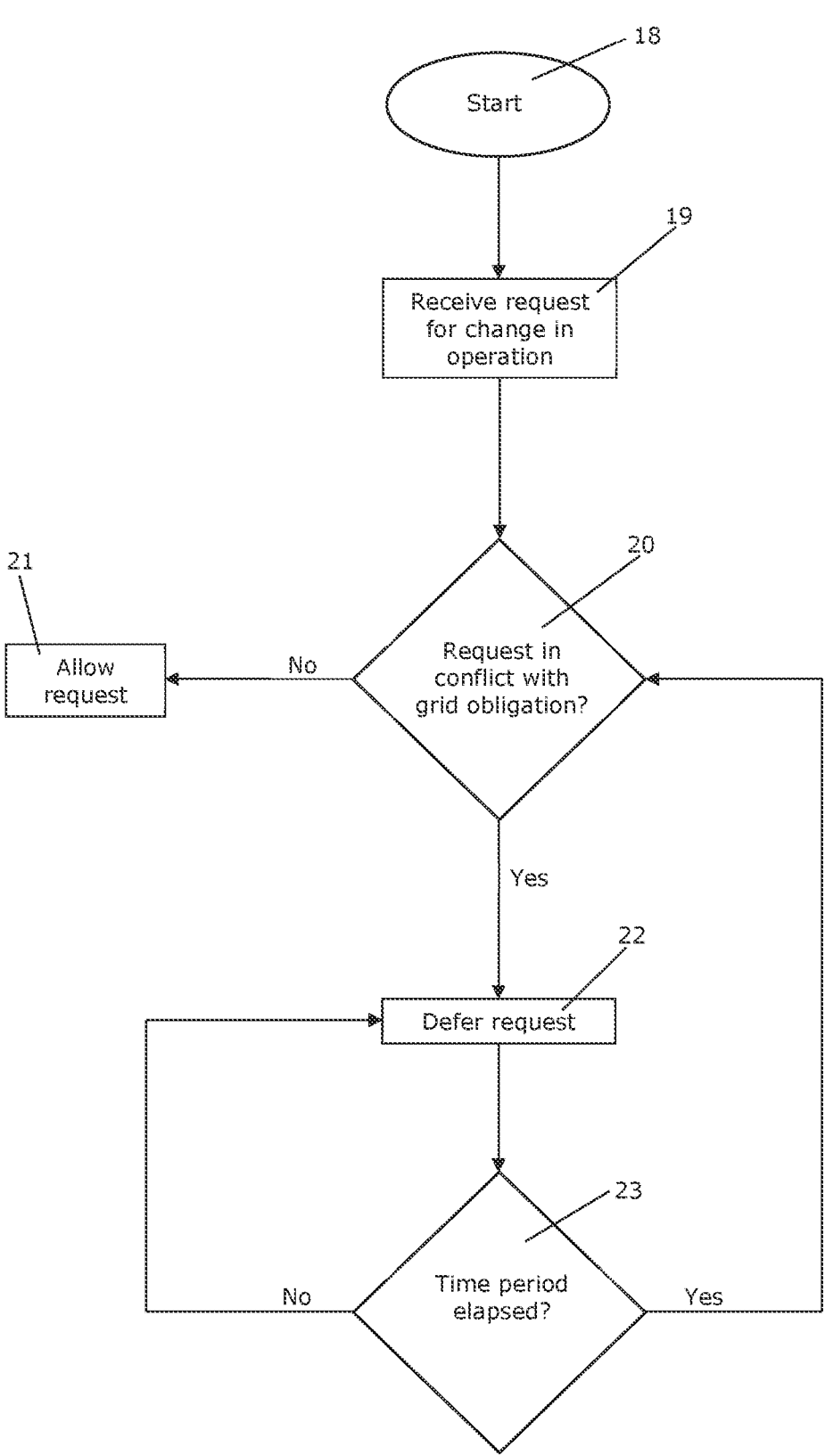
FIG. 4 is a flow chart illustrating a method according to an embodiment of the invention.

FIG. 4 is a flow chart illustrating a method according to an embodiment of the invention. The process is started at step 18. At step 19 a request for change in operation of at least one wind turbine of a renewable energy farm is received at a central control unit. The requested change in operation is of a kind which causes a change in power output of the wind turbine.

At step 20 the central control unit checks whether or not the requested change in operation is in conflict with at least one obligation of the renewable energy farm towards the power grid, in the sense that the expected change in power output is in conflict with at least one obligation. If this is not the case, the process is forwarded to step 21, where the request is allowed, and the change in operation of the wind turbine is executed as requested.

In the case that step 20 reveals that the requested change in operation is in conflict with at least one obligation of the renewable energy farm towards the power grid, then the process is forwarded to step 22, where the request for change in operation is deferred, in order to ensure that the obligations towards the power grid can be fulfilled.

At step 23 it is investigated whether or not a specified time period has elapsed. If this is not the case, the process is returned to step 22, and the request of change of operation of the wind turbine remains deferred.

When the specified time period has elapsed, the process is returned to step 20, where the central control unit checks whether or not the request is still in conflict with at least one obligation of the renewable energy farm towards the power grid. If this is no longer the case, then the request is allowed at step 21, and if it is still the case, then the request remains deferred, at step 22.

The invention claimed is:

1. A method for controlling a renewable energy farm comprising a wind turbine and at least one central control unit, the wind turbine being connected to a power grid, the method comprising:

by the at least one central control unit:

receiving a first request to stop the wind turbine;

determining, at a first time, that stopping the wind turbine causes an obligation of the renewable energy farm towards the power grid to be unfulfilled;

in response determining, at the first time, that stopping the wind turbine causes the obligation of the renewable energy farm towards the power grid to be unfulfilled, refraining from executing the first request;

determining, at a second time after the first time, that stopping the wind turbine does not result in the obligation of the renewable energy farm towards the power grid to be unfulfilled; and in response to determining, at the second time, that stopping the wind turbine does not result in the obligation of the renewable energy farm towards the power grid to be unfulfilled, executing the first request.

2. The method of claim 1, further comprising:

receiving, at a third time after the second time, a second request to restart the wind turbine;

determining, at the third time, that restarting the wind turbine is not in conflict with at least one obligation of the renewable energy farm towards the power grid; and in response to determining, at the third time, that restarting the wind turbine is not in conflict with at least one obligation of the renewable energy farm towards the power grid, executing the second request.

3. The method of claim 1, wherein determining that the stopping the wind turbine causes the obligation of the renewable energy farm towards the power grid to be unfulfilled comprises:

comparing at least one of a frequency or a voltage of the power grid to a predefined deadband; and determining that stopping the wind turbine is in conflict with at least one obligation of the renewable energy farm towards the power grid when at least one of the frequency or the voltage is outside the predefined deadband.

4. The method of claim 1, wherein determining that stopping the wind turbine causes the obligation of the renewable energy farm towards the power grid to be unfulfilled comprises:

checking whether or not a power output requirement from the renewable energy farm to the power grid is applicable; and determining that stopping the wind turbine causes the obligation of the renewable energy farm towards the power grid to be unfulfilled when a power output requirement of the wind turbine is applicable.

5. The method of claim 1, wherein the obligation towards the power grid comprises an ancillary service obligation towards the power grid, and wherein determining that stopping the wind turbine causes the obligation of the renewable energy farm towards the power grid to be unfulfilled comprises:

estimating whether or not stopping the wind turbine is likely to cause incapability of fulfilling the ancillary service obligation; and determining that stopping the wind turbine causes the obligation of the renewable energy farm towards the power grid to be unfulfilled when stopping the wind turbine is likely to cause incapability of fulfilling the ancillary service obligation.

6. The method of claim 1, wherein determining that stopping the wind turbine causes the obligation of the renewable energy farm towards the power grid to be unfulfilled is performed according to a set of prioritizing rules.

7. The method of claim 1, wherein the renewable energy farm further comprises a plurality of photovoltaic cells, and wherein the method further comprises: the at least one central control unit receiving a second request for adjusting a power output of at least one photovoltaic cell of the plurality of photovoltaic cells; the at least one central control unit checking whether or not adjusting the power output of the at least one photovoltaic cell is in conflict with at least one obligation of the renewable energy farm towards the power grid; and when adjusting the power output of the at least one photovoltaic cell is in conflict with at least one obligation of the renewable energy farm towards the power grid, deferring execution of the second request.

8. The method of claim 1, wherein the at least one central control unit is a power plant controller (PPC).

9. The method of claim 1, wherein receiving the first request comprises receiving the first request at a predetermined time of day.

10. A method for controlling a renewable energy farm comprising a wind turbine, the wind turbine being connected to a power grid, the method comprising:

receiving a first request to stop the wind turbine;

determining, at a first time, that stopping the wind turbine causes an obligation of the renewable energy farm towards the power grid to be unfulfilled;

in response determining, at the first time, that stopping the wind turbine causes the obligation of the renewable energy farm towards the power grid to be unfulfilled, refraining from executing the first request;

determining, at a second time after the first time, that stopping the wind turbine does not result in the obligation of the renewable energy farm towards the power grid to be unfulfilled;

in response to determining, at the second time, that stopping the wind turbine does not result in the obligation of the renewable energy farm towards the power grid to be unfulfilled, executing the first request; and for a second request in which a power output of the wind turbine is decreased from a first power output to a second power output that is greater than zero does not cause the obligation of the renewable energy farm towards the power grid to be unfulfilled, executing the second request to decrease the power output of the wind turbine from the first power output to the second power output.

11. The method of claim 10, wherein determining that stopping the wind turbine causes the obligation of the renewable energy farm towards the power grid to be unfulfilled comprises:

comparing at least one of a frequency or a voltage of the power grid to a predefined deadband; and determining that stopping the wind turbine causes the obligation of the renewable energy farm towards the power grid to be unfulfilled when at least one of the frequency or the voltage is outside the predefined deadband.

12. The method of claim 10, wherein determining that stopping the wind turbine causes the obligation of the renewable energy farm towards the power grid to be unfulfilled comprises:

checking whether or not a power output requirement from the renewable energy farm to the power grid is applicable; and determining that stopping the wind turbine causes the obligation of the renewable energy farm towards the power grid to be unfulfilled when a power output requirement is applicable.

13. The method of claim 10, wherein the obligation towards the power grid is an ancillary service obligation towards the power grid, and wherein determining that stopping the wind turbine causes the obligation of the renewable energy farm towards the power grid to be unfulfilled comprises:

estimating whether or not stopping the wind turbine is likely to cause incapability of fulfilling the ancillary service obligation; and determining that stopping the wind turbine causes the obligation of the renewable energy farm towards the power grid to be when stopping the wind turbine is likely to cause incapability of fulfilling the ancillary service obligation.

14. The method of claim 10, wherein determining that stopping the wind turbine causes the obligation of the renewable energy farm towards the power grid to be unfulfilled comprises:

for the first request:

comparing at least one of a frequency or a voltage of the power grid to a predefined deadband; and determining that stopping the wind turbine causes the obligation of the renewable energy farm towards the power grid to be unfulfilled when at least one of the frequency or the voltage is outside the predefined deadband; and for the second request:

checking whether or not a power output requirement from the renewable energy farm to the power grid is applicable; and determining that decreasing the power output of the wind turbine from the first power output to the second power output causes the obligation of the renewable energy farm towards the power grid to be unfulfilled when the power output requirement is applicable.

* * * * *